United States Patent
Gan et al.

(10) Patent No.: US 10,438,572 B2
(45) Date of Patent: Oct. 8, 2019

(54) SOUND EFFECT PARAMETER ADJUSTMENT METHOD, MOBILE TERMINAL AND STORAGE MEDIUM

(71) Applicant: GUANGDONG OPPO MOBILE TELECOMMUNICATIONS CORP., LTD., Dongguan, Guangdong (CN)

(72) Inventors: Gaoting Gan, Dongguan (CN); Yajun Li, Dongguan (CN); Guang Tu, Dongguan (CN); Hai Yang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/053,292

(22) Filed: Aug. 2, 2018

(65) Prior Publication Data

US 2018/0342231 A1    Nov. 29, 2018

Related U.S. Application Data

(63) Continuation of application No. PCT/CN2017/088706, filed on Jun. 16, 2017.

(30) Foreign Application Priority Data

Jun. 16, 2016 (CN) .......................... 2016 1 0447234

(51) Int. Cl.
*G10H 1/02* (2006.01)
*G10H 1/00* (2006.01)
*G06F 3/16* (2006.01)

(52) U.S. Cl.
CPC ............ *G10H 1/0091* (2013.01); *G06F 3/16* (2013.01); *G06F 3/165* (2013.01)

(58) Field of Classification Search
CPC ............... G10H 1/02; G10H 2210/235; G10H 2210/241; G10H 2210/391;
(Continued)

(56) References Cited

U.S. PATENT DOCUMENTS

| 2004/0211309 A1* | 10/2004 | Hsieh | ....................... G10H 1/46 84/603 |
| 2006/0137510 A1* | 6/2006 | Cui | ......................... A63J 17/00 84/464 R |

(Continued)

FOREIGN PATENT DOCUMENTS

| CN | 101174818 A | 5/2008 |
| CN | 102237855 A | 11/2011 |

(Continued)

OTHER PUBLICATIONS

International Search Report in international application No. PCT/CN2017/088706, dated Sep. 19, 2017.
(Continued)

*Primary Examiner* — Marlon T Fletcher
(74) *Attorney, Agent, or Firm* — Ladas & Parry LLP

(57) ABSTRACT

A sound effect parameter adjustment method, and a mobile terminal. The method comprises: obtaining a sound effect parameter of a mobile terminal and determining the sound effect parameter as an initial sound effect parameter; detecting, when playing an audio file by audio playback software, whether a playback sound effect parameter of the audio file is consistent with the initial sound effect parameter; if it is detected that the playback sound effect parameter of the audio file is not consistent with the initial sound effect parameter, determining whether the playback sound effect parameter of the audio file falls within a preset sound effect parameter interval; and if not, adjusting the sound effect parameter to be within the sound effect parameter interval.

18 Claims, 5 Drawing Sheets

(58) Field of Classification Search
CPC ....... G10H 2210/185; G10H 2210/221; G10H 2210/265
See application file for complete search history.

(56) References Cited

U.S. PATENT DOCUMENTS

| | | | | |
|---|---|---|---|---|
| 2009/0013858 | A1* | 1/2009 | Obermeier | G10H 1/183 84/656 |
| 2011/0243342 | A1 | 10/2011 | Ohashi | |
| 2013/0028443 | A1* | 1/2013 | Pance | G06F 3/167 381/107 |
| 2014/0037107 | A1* | 2/2014 | Marino, Jr. | H03G 3/10 381/107 |
| 2014/0307878 | A1* | 10/2014 | Osborne | G10H 1/0008 381/56 |
| 2014/0321670 | A1* | 10/2014 | Nystrom | H03G 5/165 381/107 |
| 2016/0127815 | A1* | 5/2016 | Ookuri | H04R 1/06 381/119 |

FOREIGN PATENT DOCUMENTS

| | | |
|---|---|---|
| CN | 103929140 A | 7/2014 |
| CN | 104021148 A | 9/2014 |
| CN | 104281432 A | 1/2015 |
| CN | 106126175 A | 11/2016 |
| WO | 2015180584 A1 | 12/2015 |

OTHER PUBLICATIONS

Written Opinion of the International Search Authority in international application No. PCT/CN2017/088706, dated Sep. 19, 2017.
Supplementary European Search Report in European application No. 17812763.5, dated Feb. 12, 2019.

* cited by examiner

SOUND EFFECT PARAMETER ADJUSTMENT METHOD, MOBILE TERMINAL AND STORAGE MEDIUM

CROSS-REFERENCE TO RELATED APPLICATION

This application is a continuation of International Application No. PCT/CN2017/088706, filed on Jun. 16, 2017, which claims priority to Chinese Patent Application No. 201610447234.X, filed on Jun. 16, 2016, the contents of which are hereby incorporated by reference in its entirety.

TECHNICAL FIELD

The disclosure relates to the technical field of mobile terminals, and more particularly to a method for adjusting a parameter of sound effect, a mobile terminal and a storage medium.

BACKGROUND

At present, audio files of different sources and different types may be played by using different application programs installed in a mobile terminal. The mobile terminal may usually add a sound effect, for example, a global sound effect, to an audio file to be played, to enhance a playing effect of the audio file. However, an application program may also add a sound effect, for example, a partial sound effect, to the played audio file according to different types of the audio file, causing addition of multiple sound effects when the audio file is to be played.

SUMMARY

Embodiments of the disclosure provide a method for adjusting a parameter of sound effect, a mobile terminal and a storage medium, which can eliminate multiple sound effects added to an audio file, improve a playing effect of the audio file and further improve user experiences.

According to a first aspect, the embodiments of the disclosure provide a method for adjusting a parameter of sound effect, which may include the following operations. A parameter of sound effect of a mobile terminal is acquired, and the parameter of sound effect is determined to be an initial parameter of sound effect. When an audio file is to be played through audio playing software, it is detected whether a parameter of sound effect for playing the audio file is consistent with the initial parameter of sound effect. Upon detection of the parameter of sound effect for playing the audio file is inconsistent with the initial parameter of sound effect, it is determined whether the parameter of sound effect for playing the audio file falls within a preset range of the parameter of sound effect. When a result of the determination is NO, the parameter of sound effect is adjusted to be within the range of the parameter of sound effect.

According to a second aspect, the embodiments of the disclosure provide a mobile terminal, which includes a processor, a memory, a communication interface and a communication bus. The processor, the memory and the communication interface are connected through the communication bus and complete mutual communication. The memory stores an executable program code, and the communication interface is configured for wireless communication; and the processor is configured to call the executable program code in the memory to execute part or all of the operations described in any method according to the first aspect of the embodiments of the disclosure.

According to a third aspect, the embodiments of the disclosure provide a non-transitory computer-readable storage medium. The non-transitory computer-readable storage medium storing instructions, which, when being running in a computer, cause the computer to execute any method in the first aspect.

BRIEF DESCRIPTION OF DRAWINGS

In order to describe the technical solutions in the embodiments of the application more clearly, the drawings required to be used in descriptions about the embodiments will be simply introduced below.

DETAILED DESCRIPTION

In order to make the solutions of the disclosure better understood by those skilled in the art, the technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "first", "second" and the like in the specification, claims and drawings of the disclosure are adopted not to describe a specific sequence but to distinguish similar objects. In addition, terms "include" and "have" and any transformation thereof are intended to cover nonexclusive inclusions. For example, a process, method, system, product or equipment including a series of operations or units is not limited to the operations or units which are listed, but may alternatively further include operations or units which are not listed or alternatively further include other operations or units intrinsic to the process, the method, the product or the equipment.

"Embodiment" mentioned in the disclosure means that a specific characteristic, structure or property described in combination with the embodiment may be included in at least one embodiment of the disclosure. Appearance of this phrase at each position in the specification may not always refer to the same embodiment as well as an independent or alternative embodiment mutually exclusive with the other embodiments. Those skilled in the art explicitly and implicitly understand that the embodiments described in the disclosure may be combined with the other embodiments.

The methods for adjusting a parameter of sound effect according to various embodiments of the disclosure will be described below.

Figure 1:
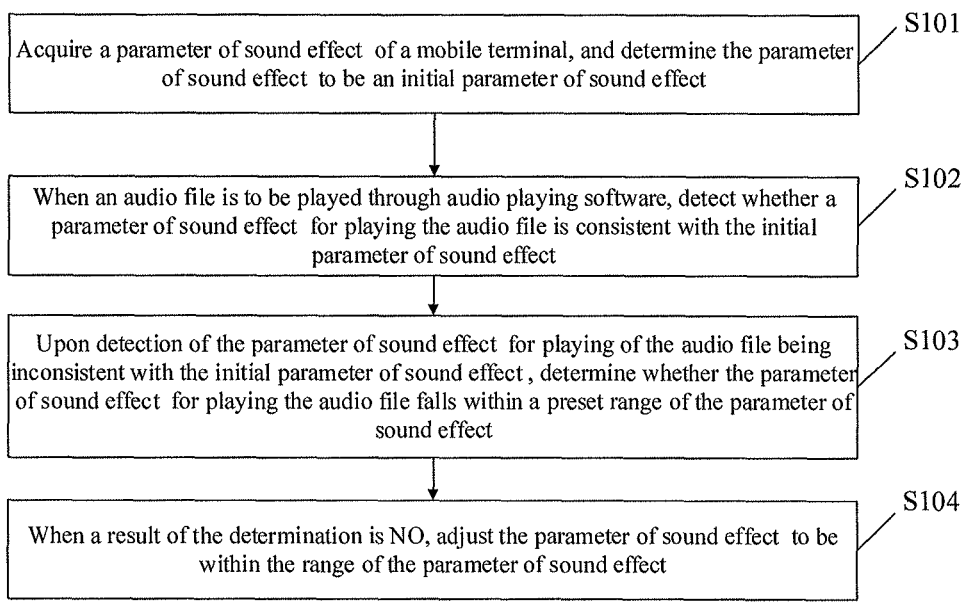
FIG. 1 illustrates a flowchart of a method for adjusting a parameter of sound effect according to some embodiments of the disclosure.

FIG. 1 illustrates a flowchart of a method for adjusting a parameter of sound effect according to some embodiments of the disclosure. The method may be implemented by a mobile terminal described in the device embodiment. As illustrated in FIG. 1, the method may include the following operations.

In S101, a parameter of sound effect of the mobile terminal is acquired, and the parameter of sound effect is determined to be an initial parameter of sound effect.

In an embodiment, the parameter of sound effect of the mobile terminal may be acquired, and the parameter of sound effect may be determined to be the initial parameter of sound effect. Specifically, the mobile terminal may set the parameter of sound effect for all audio files in the mobile terminal. The parameter of sound effect may be a global parameter of sound effect. Or, the mobile terminal may set different parameter of sound effects according to different sources or different file types of the audio files. For example, the parameter of sound effect set by the mobile terminal for an audio file such as a call record is to highlight articulation and fidelity of this type of audio file, and the parameter of sound effect set for an audio file in a game is to highlight a rhythm and background music of this type of audio file. In the embodiment of the disclosure, the global parameter of sound effect set by the mobile terminal for all the audio files may be acquired; and based on an audio file to be played, the parameter of sound effect set by the mobile terminal for the type of the audio file to be played may also be acquired, and the parameter of sound effect is determined to be the initial parameter of sound effect. In this way, when the audio file is to be played in the audio player, it is able to detect whether an audio player adds a sound effect to the audio file.

In S102, when an audio file is to be played through audio playing software, it is detected whether a parameter of sound effect for playing the audio file is consistent with the initial parameter of sound effect.

In an embodiment, when the audio file is to be played through the audio playing software, it is detected whether the parameter of sound effect for playing the audio file is consistent with the acquired initial parameter of sound effect. If YES, it indicates that the audio playing software does not add any sound effect to the audio file, and sound effect adjustment may be performed on the audio file through the acquired parameter of sound effect of the mobile terminal, to enhance a sound output effect of the audio file. If NO, it indicates that the audio playing software also adds a sound effect to the audio file, and it is to be further determined whether multiple sound effects have a negative effect on a playing effect of the audio file. It is to be noted that, since the audio playing software may add the sound effect within the whole playing time of the audio file or may add the sound effect within part of the playing time of the audio file, when the audio file is to be played through the audio playing software, it may be detected whether the parameter of sound effect for the audio file is consistent with the initial parameter of sound effect in real time, or it may be detected whether the parameter of sound effect for playing the audio file is consistent with the initial parameter of sound effect at a preset detection period.

In S103, upon detection of the parameter of sound effect for playing the audio file being inconsistent with the initial parameter of sound effect, it is determined whether the parameter of sound effect for playing the audio file falls within a preset range of the parameter of sound effect.

In an embodiment, upon detection of the parameter of sound effect for the audio file being inconsistent with the initial parameter of sound effect, it is determined whether the parameter of sound effect for playing the audio file falls within the preset range of the parameter of sound effect. Specifically, upon detection of the parameter of sound effect for playing the audio file being inconsistent with the initial parameter of sound effect, it may be determined whether the parameter of sound effect over the whole playing time of the audio file falls within the preset range of the parameter of sound effect, or it may be determined whether the parameter of sound effect within a part of the playing time of the audio file falls within the preset range of the parameter of sound effect. A parameter of sound effect within the preset range of the parameter of sound effect may ensure the playing effect of the audio file. In an example, the range of the parameter of sound effect may be set according to a music type of the audio file or a file type of the audio file. Alternatively, the range of the parameter of sound effect may be determined by considering a factor such as a geographical environment and time for playing the audio file through the audio playing software, in addition to combining the music type of the audio file and the file type of the audio file. The range of the parameter of sound effect may form a mapping relationship with the playing time of the audio file, that is, different range of the parameter of sound effects are employed at different points in the playing time line.

In S104, when a result of the determination is NO, the parameter of sound effect is adjusted to be within the range of the parameter of sound effect.

In an embodiment, if it is determined that the parameter of sound effect for playing the audio file does not fall within the preset range of the parameter of sound effect, the parameter of sound effect may be adjusted to be within the range of the parameter of sound effect. Specifically, the parameter of sound effect may be adjusted to be an endpoint value of the range of the parameter of sound effect, for example, a maximum value and minimum value in the range of the parameter of sound effect, or the parameter of sound effect may be adjusted to be any value in the range of the parameter of sound effect, or the parameter of sound effect may be adjusted to be a preferred value in the range of the parameter of sound effect. The preferred value in the range of the parameter of sound effect may be determined by a sound effect mode matched with the audio file. For example, the sound effect mode corresponding to the audio file may be determined by considering at least one of the following factors: time, ambient noise and geographical position for the audio file currently played through music playing software. After the sound effect mode of the audio file is determined, a first parameter of sound effect corresponding to the sound effect mode may be acquired. For another example, a second parameter of sound effect may be acquired on a parameter of sound effect sharing platform set in the mobile terminal. Specifically, the second parameter of sound effect corresponding to the sound effect mode may be found by searching for the sound effect mode or searching audio file(s) of this type (wherein the type may include the music type or the file type), and the parameter of sound effect for playing the audio file may be adjusted according to the second parameter of sound effect.

In the embodiments of the disclosure, a parameter of sound effect of a mobile terminal is acquired, and the parameter of sound effect is determined to be an initial parameter of sound effect; when an audio file is to be played through audio playing software, it is detected whether the parameter of sound effect for playing the audio file is consistent with the initial parameter of sound effect; if YES, it indicates that the audio playing software adds no parameter of sound effect to the audio file, and if NO, it indicates that multiple sound effects on the audio file are detected, and it is further determined whether the parameter of sound effect for playing the audio file falls within a preset range of the parameter of sound effect; and when it is determined that the parameter of sound effect does not fall within the preset range of the parameter of sound effect, it indicates that a sound effect playing effect of the audio file is influenced by the multiple sound effects, and the parameter of sound effect for the audio file is adjusted to be within the range of the parameter of sound effect. In such a manner, the multiple sound effects added to the audio file can be eliminated, and the playing effect of the audio file is improved, thereby improving user experiences.

Figure 2:
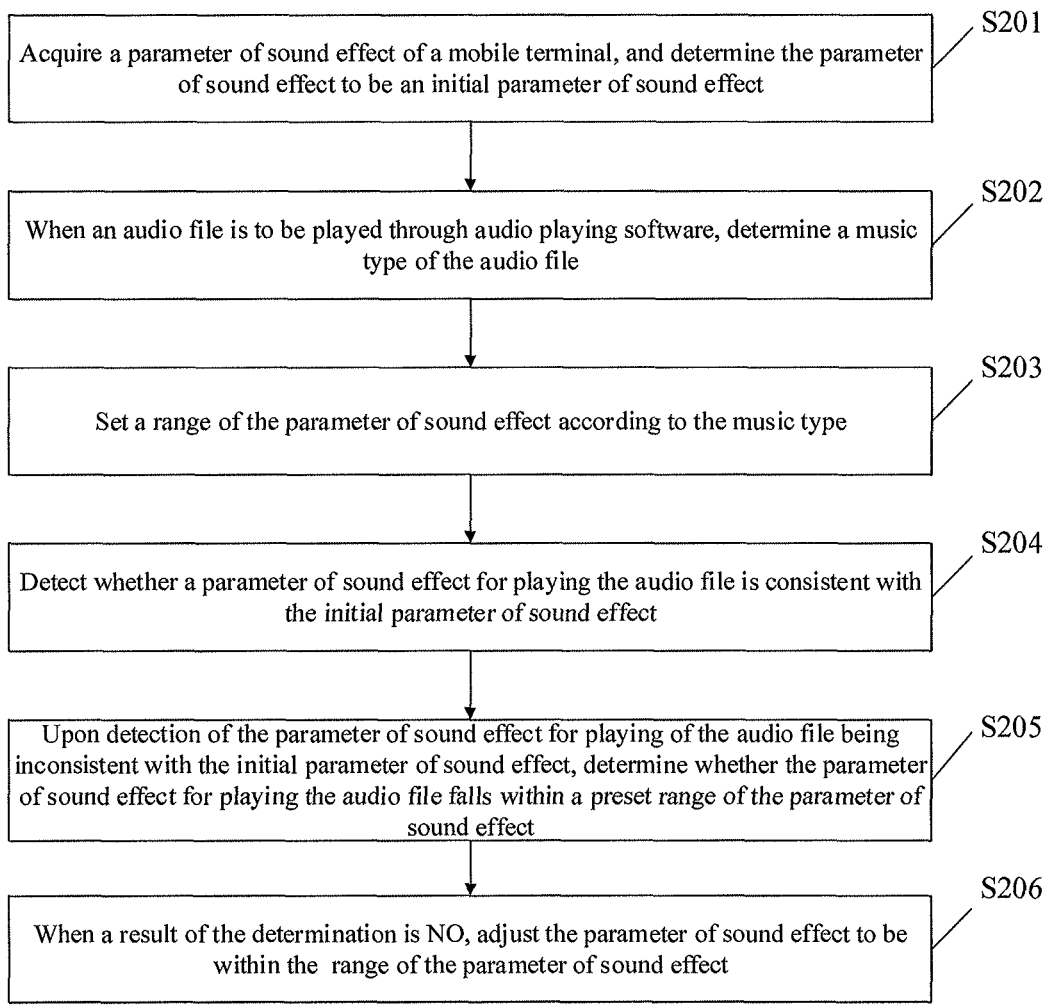
FIG. 2 illustrates a flowchart of another method for adjusting a parameter of sound effect according to some embodiments of the disclosure.

FIG. 2 illustrates a flowchart of another method for adjusting a parameter of sound effect according to some embodiments of the disclosure. The method may be implemented by a mobile terminal described in the device embodiment. As illustrated in FIG. 2, the method may include the following operations.

In S201, a parameter of sound effect of the mobile terminal is acquired, and the parameter of sound effect is determined to be an initial parameter of sound effect.

In an embodiment, the parameter of sound effect of the mobile terminal may be acquired, and the parameter of sound effect may be determined to be the initial parameter of sound effect. Specifically, the mobile terminal may set the parameter of sound effect for all audio files in the mobile terminal. The parameter of sound effect may be a global parameter of sound effect. Or, the mobile terminal may set different parameter of sound effects according to different sources or different file types of the audio files. For example, the parameter of sound effect set by the mobile terminal for an audio file such as a call record is to highlight articulation and fidelity of this type of audio file, and the parameter of sound effect set for an audio file in a game is to highlight a rhythm and background music of this type of audio file. In the embodiment of the disclosure, the global parameter of sound effect set by the mobile terminal for all the audio files may be acquired; and based on an audio file to be played, the parameter of sound effect set by the mobile terminal for the type of the audio file to be played may also be acquired, and the parameter of sound effect is determined to be the initial parameter of sound effect. In this way, when the audio file is to be played in the audio player, it is able to detect whether an audio player adds a sound effect to the audio file.

In S202, when an audio file is to be played through audio playing software, a music type of the audio file is determined.

In an embodiment, when the audio file is to be played through the audio playing software, the music type of the audio file may be determined. The music type of the audio file may be determined on the basis of a tag contained in the audio file, and the tag is used to identify the music type of the audio file. For example, if the tag contained in the audio file includes light music, classical music, folk music or an emotion keyword corresponding to the word such as "soft" or "gentle", it is determined that the music type of the audio file is a soft and slow type. For another example, if the tag contained in the audio file includes rock and roll, a game, running or an emotion or scene keyword corresponding to the word such as "passion", it is determined that the music type of the audio file is a strong type. Of course, the music type may further include various other types, for example, each type of tags corresponds to a music type, and there are no limits made in the embodiment of the disclosure.

In S203, a range of the parameter of sound effect is set according to the music type.

In an embodiment, the range of the parameter of sound effect may be set according to the determined music type. Specifically, for different music types, different range of the parameter of sound effects and endpoint values may be set. For example, when the music type is the soft and slow type, the range of the parameter of sound effect is relatively narrow and the endpoint values are relatively small. For another example, when the music type is the strong type, the range of the parameter of sound effect is relatively wide and the endpoint values are relatively large. Of course, the range of the parameter of sound effect may be set in combination with audio data of the audio file, and when the audio data of the audio file has relatively large sound frequencies, and the music type is the strong type, the range of the parameter of sound effect is narrower than the range in case of relatively small sound frequencies, and the endpoint values are smaller than the endpoint values in case of the relatively small sound frequencies, to avoid influence of sound effect output on a playing effect of the audio file. Another combination manner may include combination with a playing environment of the audio file. For example, when the audio file is played outdoors, the output effect to be achieved is to be more prominent than that achieved when the audio file is played indoors.

In S204, it is detected whether a parameter of sound effect for playing the audio file is consistent with the initial parameter of sound effect.

In an embodiment, it is detected whether the parameter of sound effect for playing the audio file is consistent with the acquired initial parameter of sound effect. If YES, it indicates that the audio playing software does not add any sound effect to the audio file, and sound effect adjustment may further be performed on the audio file through the acquired parameter of sound effect of the mobile terminal, to enhance a sound output effect of the audio file. If NO, it indicates that the audio playing software also adds a sound effect to the audio file, and it is to be further determined whether multiple sound effects have a negative effect on the playing effect of the audio file. It is to be noted that, since the audio playing software may add the sound effect within the whole playing time of the audio file or may add the sound effect within part of the playing time of the audio file, when the audio file is to be played through the audio playing software, it may be detected whether the parameter of sound effect for the audio file is consistent with the initial parameter of sound effect in real time, or it may be detected whether the parameter of sound effect for playing the audio file is consistent with the initial parameter of sound effect at a preset detection period.

In S205, upon detection of the parameter of sound effect for playing the audio file being inconsistent with the initial parameter of sound effect, it is determined whether the parameter of sound effect for playing the audio file falls within a preset range of the parameter of sound effect.

In an embodiment, upon detection of the parameter of sound effect for the audio file being inconsistent with the initial parameter of sound effect, it is determined whether the parameter of sound effect for playing the audio file falls within the preset range of the parameter of sound effect. Specifically, upon detection of the parameter of sound effect for playing the audio file being inconsistent with the initial parameter of sound effect, it may be determined whether the parameter of sound effect over the whole playing time of the audio file falls within the preset range of the parameter of sound effect, or it may be determined whether the parameter of sound effect within a part of the playing time of the audio file falls within the preset range of the parameter of sound effect. A parameter of sound effect within the preset range of the parameter of sound effect may ensure the playing effect of the audio file. In an example, the range of the parameter of sound effect may be set according to a music type of the audio file or a file type of the audio file. Alternatively, the range of the parameter of sound effect may be determined by considering a factor such as a geographical environment and time for playing the audio file through the audio playing software, in addition to combining the music type of the audio file and the file type of the audio file. The range of the parameter of sound effect may form a mapping relationship with the playing time of the audio file, that is, different range of the parameter of sound effects are employed at different points in the playing time line.

In S206, when a result of the determination is NO, the parameter of sound effect is adjusted to be within the range of the parameter of sound effect.

In an embodiment, if it is determined that the parameter of sound effect for playing the audio file does not fall within the preset range of the parameter of sound effect, the parameter of sound effect may be adjusted to be within the range of the parameter of sound effect. Specifically, if the parameter of sound effect is larger than a maximum value in the range of the parameter of sound effect, an adjustment amount is determined according to the parameter of sound effect for playing the audio file and the maximum value in the range of the parameter of sound effect, and the parameter of sound effect is adjusted to be within the range of the parameter of sound effect according to the adjustment amount. Or, if the parameter of sound effect is smaller than a minimum value in the range of the parameter of sound effect, the adjustment amount is determined according to the parameter of sound effect for playing the audio file and a minimum value in the range of the parameter of sound effect, and the parameter of sound effect is adjusted to be within the range of the parameter of sound effect according to the adjustment amount. The adjustment amount may be an adjustment increase/decrease amount, or may be an adjustment proportion, that is, according to the determined adjustment amount, an increase/decrease operation may be executed on the parameter of sound effect, or a multiplication/division operation may be executed on the parameter of sound effect, so as to adjust the parameter of sound effect to be within the range of the parameter of sound effect. Of course, another algorithm or mapping relationship may be determined according to the parameter of sound effect and an endpoint value of the range of the parameter of sound effect, to determine the adjustment amount.

In the embodiments of the disclosure, a parameter of sound effect of a mobile terminal is acquired, and the parameter of sound effect is determined to be an initial parameter of sound effect; when an audio file is to be played through audio playing software, it is detected whether the parameter of sound effect for playing the audio file is consistent with the initial parameter of sound effect; if YES, it indicates that the audio playing software adds no parameter of sound effect to the audio file, and if NO, it indicates that multiple sound effects on the audio file are detected, and it is further determined whether the parameter of sound effect for playing the audio file falls within a preset range of the parameter of sound effect; and when it is determined that the parameter of sound effect does not fall within the preset range of the parameter of sound effect, it indicates that a sound effect playing effect of the audio file is influenced by the multiple sound effects, and the parameter of sound effect for the audio file is adjusted to be within the range of the parameter of sound effect. In such a manner, the multiple sound effects added to the audio file can be eliminated, and the playing effect of the audio file is improved, thereby improving user experiences.

Figure 3:
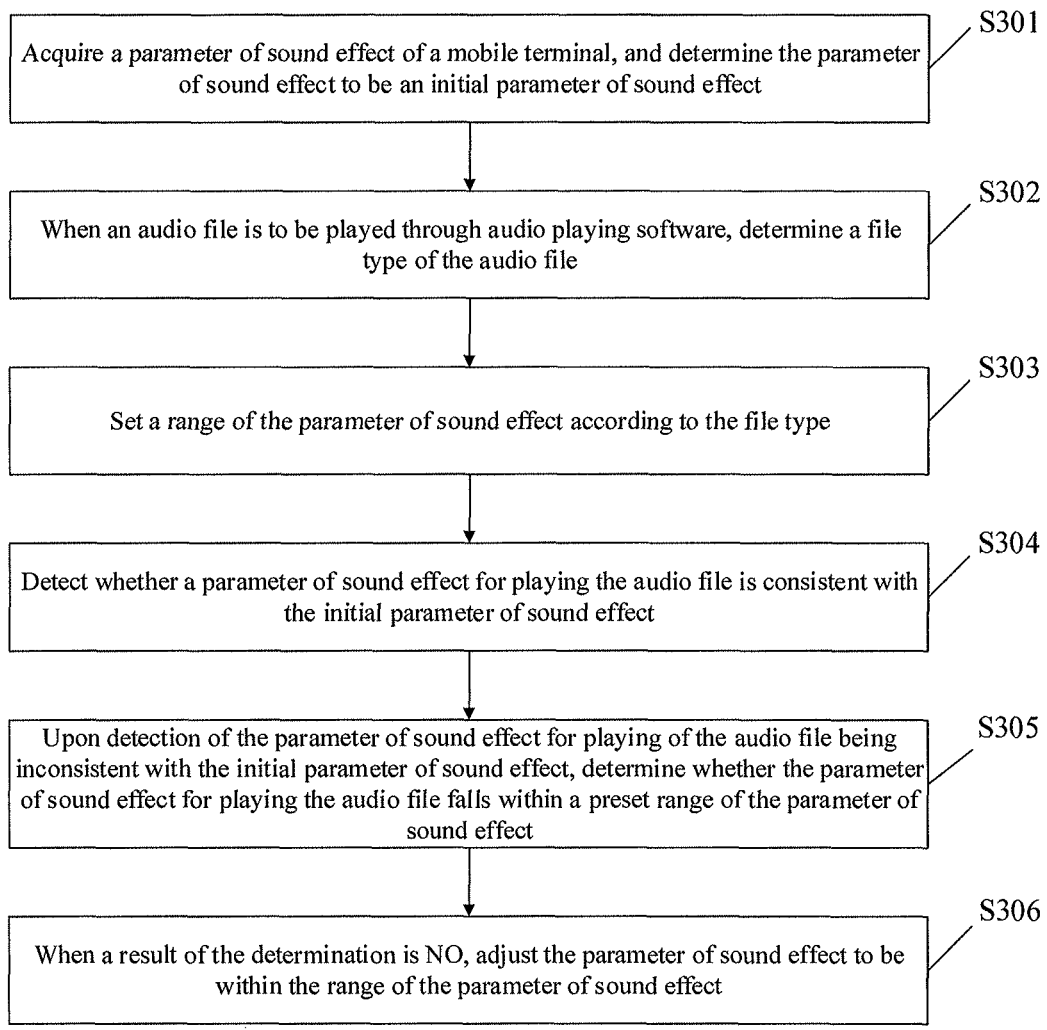
FIG. 3 illustrates a flowchart of yet another method for adjusting a parameter of sound effect according to some embodiments of the disclosure.

FIG. 3 illustrates a flowchart of another method for adjusting a parameter of sound effect according to some embodiments of the disclosure. The method may be implemented by a mobile terminal described in the device embodiment. As illustrated in FIG. 3, the method may include the following operations.

In S301, a parameter of sound effect of the mobile terminal is acquired, and the parameter of sound effect is determined to be an initial parameter of sound effect.

In S302, when an audio file is to be played through audio playing software, a file type of the audio file is determined.

In S303, a range of the parameter of sound effect is set according to the file type.

In S304, it is detected whether a parameter of sound effect for playing the audio file is consistent with the initial parameter of sound effect.

In S305, upon detection of the parameter of sound effect for playing the audio file being inconsistent with the initial parameter of sound effect, it is determined whether the parameter of sound effect for playing the audio file falls within the range of the parameter of sound effect.

In S306, when a result of the determination is NO, the parameter of sound effect is adjusted to be within the range of the parameter of sound effect.

In an embodiment, specific descriptions about S301~S302 and S305~S306 may be seen from descriptions about the related operations in the embodiment illustrated in FIG. 2 and will not be elaborated herein.

In the embodiment of the disclosure, the file type of the audio file may further be determined, and the range of the parameter of sound effect is set according to the file type. Specifically, the file type of the audio file may be determined according to an expanded name of the audio file and the like or may be determined according to a source of the audio file and the like. For example, the file type of the audio file may be determined to be a voice or recorded sound type, a music type, a game playing type and the like according to different sources. The range of the parameter of sound effect may be determined according to the file type of the audio file. Different audio files may have different file types, and playing effects of the audio files may be different from each other. Therefore, the specific range of the parameter of sound effect of an audio file may be determined according to the specific file type of the audio file, to enhance the playing effect of the audio file of the file type.

It is to be noted that manners for determining the range of the parameter of sound effect in FIG. 2 and FIG. 3 may be determining one or both of the music type and file type of the audio file. Of course, the range of the parameter of sound effect may also be determined in combination with one or more other factors, for example, the audio data of the audio file, the playing environment of the audio file and the playing time of the audio file.

Devices for adjusting a parameter of sound effect according to various embodiments of the disclosure will be described hereinafter. The devices are used for executing the methods described above.

Figure 4:
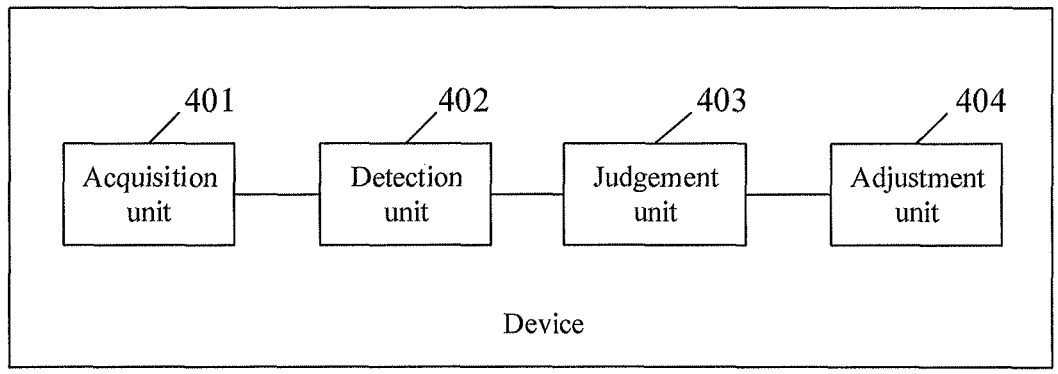
FIG. 4 illustrates a composition block diagram of units for a device for adjusting a parameter of sound effect according to some embodiments of the disclosure.

FIG. 4 illustrates a composition block diagram of units of a device for adjusting a parameter of sound effect according to some embodiments of the disclosure. As illustrated in FIG. 4, the device may include an acquisition unit 401, a detection unit 402, a judgment unit 403 and an adjustment unit 404.

The acquisition unit 401 is configured to acquire a parameter of sound effect of a terminal device and determine the parameter of sound effect to be an initial parameter of sound effect.

The detection unit 402 is configured to, when an audio file is to be played through audio playing software, detect whether a parameter of sound effect for playing the audio file is consistent with the initial parameter of sound effect.

The judgment unit 403 is configured to, when the detection unit 402 detects that the parameter of sound effect for playing the audio file is inconsistent with the initial parameter of sound effect, determine whether the parameter of sound effect for playing the audio file falls within a preset range of the parameter of sound effect.

The adjustment unit 404 is configured to, when a result of the determination of the judgment unit 403 is NO, adjust the parameter of sound effect to be within the range of the parameter of sound effect.

Descriptions about functions realized by the acquisition unit 401, the detection unit 402, the judgment unit 403 and the adjustment unit 404 may specifically be seen from descriptions about the corresponding operations in FIG. 1.

In the embodiments of the disclosure, a parameter of sound effect of a mobile terminal is acquired, and the parameter of sound effect is determined to be an initial parameter of sound effect; when an audio file is to be played through audio playing software, it is detected whether the parameter of sound effect for playing the audio file is consistent with the initial parameter of sound effect; if YES, it indicates that the audio playing software adds no parameter of sound effect to the audio file, and if NO, it indicates that multiple sound effects on the audio file are detected, and it is further determined whether the parameter of sound effect for playing the audio file falls within a preset range of the parameter of sound effect; and when it is determined that the parameter of sound effect does not fall within the preset range of the parameter of sound effect, it indicates that a sound effect playing effect of the audio file is influenced by the multiple sound effects, and the parameter of sound effect for the audio file is adjusted to be within the range of the parameter of sound effect. In such a manner, the multiple sound effects added to the audio file can be eliminated, and the playing effect of the audio file is improved, thereby improving user experiences.

Figure 5:
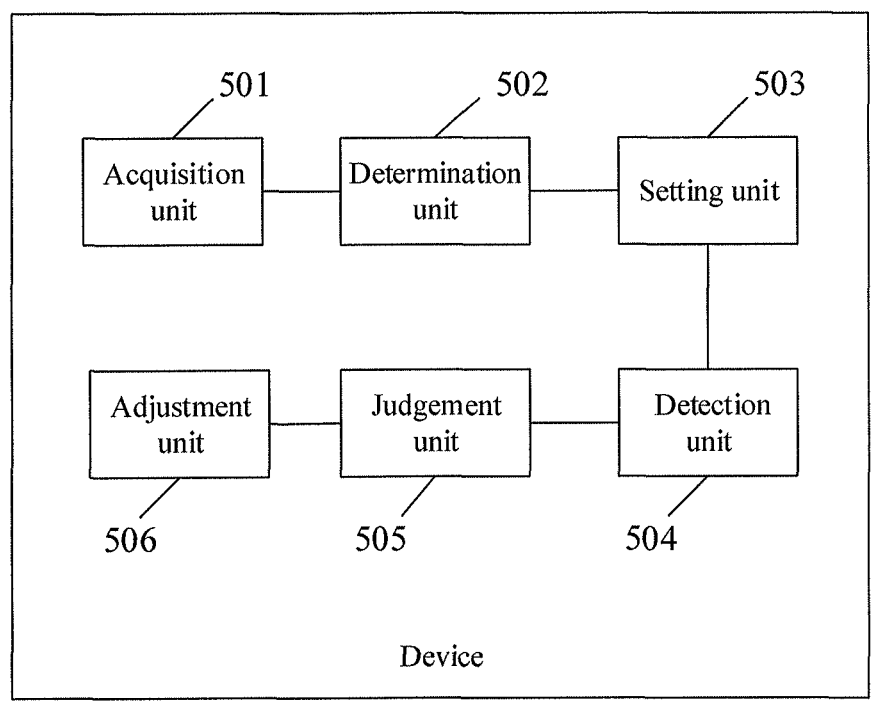
FIG. 5 illustrates a composition block diagram of units for another device for adjusting a parameter of sound effect according to some embodiments of the disclosure.

FIG. 5 illustrates a composition block diagram of units of another device for adjusting a parameter of sound effect according to some embodiments of the disclosure. The device may include an acquisition unit 501, a determination unit 502, a setting unit 503, a detection unit 504, a judgment unit 505 and an adjustment unit 506.

Descriptions about functions realized by the acquisition unit 501, the detection unit 504, the judgment unit 505 and the adjustment unit 506 may specifically be seen from descriptions about the corresponding operations in the embodiment illustrated in FIG. 2 or FIG. 3.

In an embodiment, the determination unit 502 is configured to, before the detection unit 504 detects whether the parameter of sound effect for playing the audio file is consistent with the initial parameter of sound effect, determine a music type of the audio file.

The setting unit 503 is configured to set the range of the parameter of sound effect according to the music type.

In another embodiment, the determination unit 502 is configured to, before the detection unit 504 detects whether the parameter of sound effect for playing the audio file is consistent with the initial parameter of sound effect, determine a file type of the audio file.

The setting unit 503 is configured to set the range of the parameter of sound effect according to the file type.

Functions realized by the determination unit 502 and the setting unit 503 may be seen from specific descriptions about the corresponding operations in the embodiments illustrated in FIG. 2 and FIG. 3.

In the embodiments of the disclosure, a parameter of sound effect of a mobile terminal is acquired, and the parameter of sound effect is determined to be an initial parameter of sound effect; when an audio file is to be played through audio playing software, it is detected whether the parameter of sound effect for playing the audio file is consistent with the initial parameter of sound effect; if YES, it indicates that the audio playing software adds no parameter of sound effect to the audio file, and if NO, it indicates that multiple sound effects on the audio file are detected, and it is further determined whether the parameter of sound effect for playing the audio file falls within a preset range of the parameter of sound effect; and when it is determined that the parameter of sound effect does not fall within the preset range of the parameter of sound effect, it indicates that a sound effect playing effect of the audio file is influenced by the multiple sound effects, and the parameter of sound effect for the audio file is adjusted to be within the range of the parameter of sound effect. In such a manner, the multiple sound effects added to the audio file can be eliminated, and the playing effect of the audio file is improved, thereby improving user experiences.

It is to be noted that the device for adjusting a parameter of sound effect described in the device embodiment of the disclosure is presented in form of functional unit. Term "unit" used herein should be understood as a meaning which is as broad as possible and an object configured to realize a described function of each "unit" may be, for example, an Application Specific Integrated Circuit (ASIC), a single circuit, a processor (shared, dedicated or chip unit) and memory configured to execute one or more software or firmware programs, a combined logical circuit and/or another proper component realizing the function.

Figure 6:
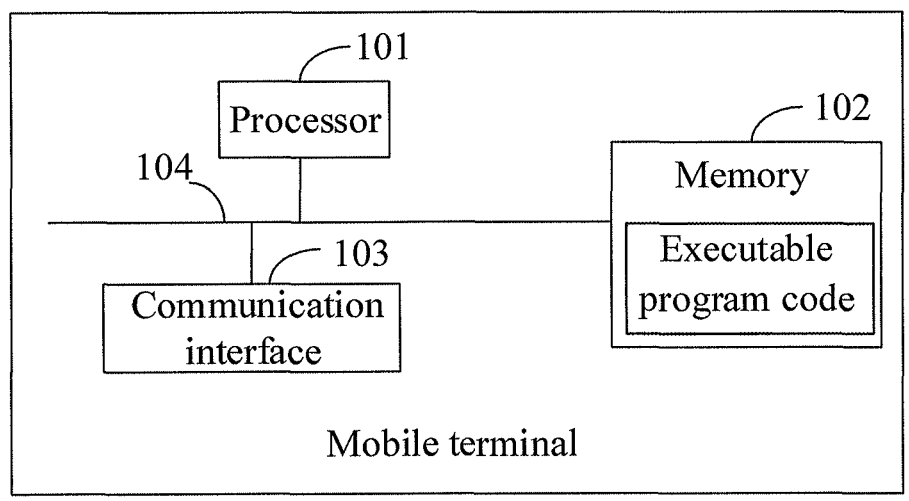
FIG. 6 illustrates a structure diagram of a mobile terminal according to some embodiments of the disclosure.

Embodiments of the disclosure further provide a mobile terminal, which, as illustrated in FIG. 6, includes: a processor 101, a memory 102, a communication interface 103 and a communication bus 104. The processor 101, the memory 102 and the communication interface 103 are connected through the communication bus 104 and complete mutual communication. The processor 101 controls wireless communication with an external cellular network through the communication interface 103. The communication interface 103 includes, but not limited to, an antenna, an amplifier, a transceiver, a coupler, a Low Noise Amplifier (LNA), a duplexer and the like. The memory 102 includes at least one of: a Random Access Memory (RAM), a non-volatile memory, or an external memory. An executable program code is stored in the memory 102, and the executable program code may guide the processor 101 to execute a method specifically disclosed in the method embodiment of the disclosure, including the following operations.

The processor 101 acquires a parameter of sound effect of the mobile terminal and determines the parameter of sound effect to be an initial parameter of sound effect.

When an audio file is to be played through audio playing software, the processor 101 detects whether a parameter of sound effect for playing the audio file is consistent with the initial parameter of sound effect.

Upon detection of the parameter of sound effect for playing the audio file being inconsistent with the initial parameter of sound effect, the processor 101 determines whether the parameter of sound effect for playing the audio file falls within a preset range of the parameter of sound effect.

When a result of the determination is NO, the processor 101 adjusts the parameter of sound effect to be within the range of the parameter of sound effect.

In the embodiments of the disclosure, a parameter of sound effect of a mobile terminal is acquired, and the parameter of sound effect is determined to be an initial parameter of sound effect; when an audio file is to be played through audio playing software, it is detected whether the parameter of sound effect for playing the audio file is consistent with the initial parameter of sound effect; if YES, it indicates that the audio playing software adds no parameter of sound effect to the audio file, and if NO, it indicates that multiple sound effects on the audio file are detected, and it is further determined whether the parameter of sound effect for playing the audio file falls within a preset range of the parameter of sound effect; and when it is determined that the parameter of sound effect does not fall within the preset range of the parameter of sound effect, it indicates that a sound effect playing effect of the audio file is influenced by the multiple sound effects, and the parameter of sound effect for the audio file is adjusted to be within the range of the parameter of sound effect. In such a manner, the multiple sound effects added to the audio file can be eliminated, and the playing effect of the audio file is improved, thereby improving user experiences.

In addition, the executable program code stored in the memory 102 is further configured to execute the related operations of the methods illustrated in FIGS. 2 and 3, which will not be elaborated herein.

Figure 7:
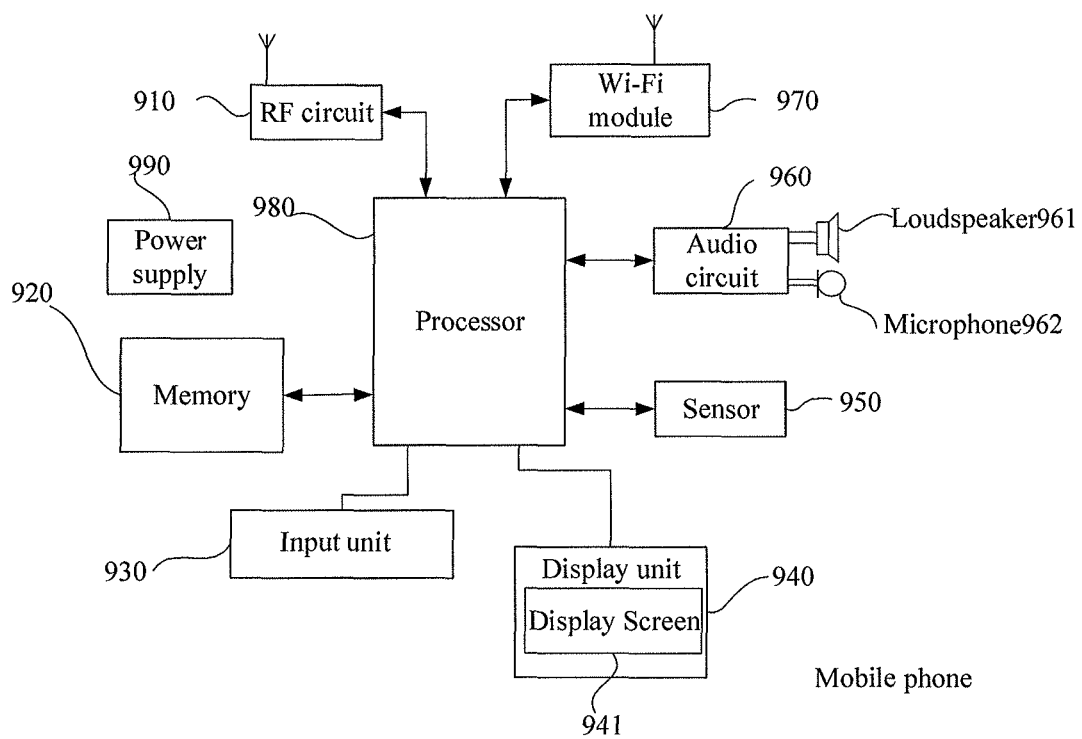
FIG. 7 illustrates a structure diagram of another mobile terminal according to some embodiments of the disclosure.

Embodiments of the disclosure further provide another mobile terminal. As illustrated in FIG. 7, for convenience of description, only parts related to the embodiment of the disclosure are illustrated, and specific technical details which are undisclosed may be seen from parts of the method of the embodiments of the disclosure. The mobile terminal may be any terminal device including a mobile phone, a tablet computer, a Personal Digital Assistant (PDA), a Point of Sales (POS), a vehicle-mounted computer and the like. For example, the mobile terminal is a mobile phone.

FIG. 7 illustrates a block diagram of part of a structure of a mobile phone related to a mobile terminal according to some embodiments of the disclosure. As illustrated in FIG. 7, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone illustrated in FIG. 7 is not intended to limit the mobile phone and may include more or fewer components than those illustrated in the figure or some components are combined or different component arrangements are adopted.

Each component of the mobile phone will be specifically introduced below in combination with FIG. 7.

The RF circuit 910 may be configured to receive and send information. The RF circuit 910 usually includes, but not limited to, an antenna, at least one amplifier, a transceiver, a coupler, an LNA, a duplexer and the like. In addition, the RF circuit 910 may also communicate with a network and other equipment in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 920 may be configured to store one or more software programs and modules. The processor 980 operates the software programs and modules stored in the memory 920, thereby executing various function applications and data processing of the mobile phone. The memory 920 may mainly include a program storage region and a data storage region. The program storage region may store an operating system, an application program required by at least one function and the like, and the data storage region may store data created according to use of the mobile phone and the like. In addition, the memory 920 may include a high-speed RAM, and may further include a non-volatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include, but not limited to, one or more of a physical keyboard, a function key (for example, a volume control key and an on-off key), a trackball, a mouse, a joystick, a fingerprint recognition module and the like.

The display unit 940 may be configured to display information input by the user or information provided for the user and various menus of the mobile phone. The display unit 940 may include a display screen 941. In an example, the display screen 941 may be configured in form of a Liquid Crystal Display (LCD), an Organic Light-Emitting Diode (OLED) and the like.

The mobile phone may further include at least one sensor 950, for example, a light sensor, a motion sensor and another sensor. Specifically, the light sensor may include an environmental light sensor and a proximity sensor, wherein the environmental light sensor may adjust brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960, a loudspeaker 961 and a microphone 962 may provide an audio interface between the user and the mobile phone. The audio circuit 960 may transmit an electric signal converted from received audio data to the loudspeaker 961, and then the loudspeaker 961 converts it into a sound signal for output. On the other aspect, the microphone 962 converts a collected sound signal into an electric signal, and then the audio circuit 960 receives and converts it into audio data and outputs the audio data to the processor 980 for processing and sending to, for example, another mobile phone through the RF circuit 910 or outputs the audio data to the memory 920 for further processing.

Wi-Fi is a short-distance wireless communication technology. The mobile phone may help the user to receive and send an electronic mail, browse a webpage, access streaming media and the like through the Wi-Fi module 970, and provides wireless broadband Internet access for the user. Although the Wi-Fi module 970 is illustrated in FIG. 7, it can be understood that it is not a necessary component of the mobile phone and may completely be omitted as desired without changing the scope of the essence of the disclosure.

The processor 980 is a control center of the mobile phone, connects each part of the whole mobile phone by virtue of various interfaces and lines and executes various functions and data processing of the mobile phone by operating or executing the software program and/or module stored in the memory 920 and calling data stored in the memory 920, thereby monitoring the whole mobile phone. The processor 980 may include one or more core processing units. Preferably, the processor 980 may integrate an application processor and a modulation and demodulation processor, wherein the application processor mainly processes the operating system, a user interface, an application program and the like, and the modulation and demodulation processor mainly processes wireless communication. It can be understood that the modulation and demodulation processor may also not be integrated into the processor 980.

The mobile phone further includes the power supply 990 (for example, a battery) supplying power to each component. Preferably, the power supply may be logically connected with the processor 980 through a power management system, thereby realizing functions of charging and discharging management, power consumption management and the like through the power management system.

Although not illustrated in the figure, the mobile phone may further include a camera, a Bluetooth module and the like, which will not be elaborated herein.

In the embodiments illustrated in FIG. 1 to FIG. 3, each operation of the method flows may be implemented on the basis of the structure of the mobile phone.

In the embodiments illustrated in FIG. 4 and FIG. 5, the function of each unit may be realized on the basis of the structure of the mobile phone.

Embodiments of the disclosure further provide a computer storage medium, wherein the computer storage medium may store a program, and when the program is executed, part or all of the operations of any method for adjusting a parameter of sound effect recorded in the method embodiment are included.

It is to be noted that, for simple description, each method embodiment is expressed into a combination of a series of actions. However, those skilled in the art should know that the disclosure is not limited by an action sequence described herein because some operations may be executed in another sequence or at the same time according to the disclosure. Second, those skilled in the art should also know that the embodiments described in the specification all belong to preferred embodiments and involved actions and modules are not always necessary to the disclosure.

Each embodiment in the abovementioned embodiments is described with different emphases, and undetailed parts in a certain embodiment may refer to related descriptions in the other embodiments.

In some embodiments provided by the application, it should be understood that the disclosed device may be implemented in another manner. For example, the device embodiment described above is only schematic, and for example, division of the units is only logical function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable memory. Based on such an understanding, the technical solutions of the disclosure substantially or parts making contributions to a conventional art or all or part of the technical solutions may be embodied in form of software product, and the computer software product is stored in a memory, including a plurality of instructions configured to cause a computer device (which may be a personal computer, a server, network equipment or the like) to execute all or part of the operations of the method in each embodiment of the disclosure. The memory includes: various media capable of storing program codes such as a U disk, a Read-Only Memory (ROM), a RAM, a mobile hard disk, a magnetic disk or an optical disk.

Those of ordinary skilled in the art can understand that all or part of the operations in various methods of the embodiments may be completed by related hardware instructed by a program, the program may be stored in a computer-readable memory, and the memory may include a flash disk, a ROM, a RAM, a magnetic disk, an optical disk or the like.

The embodiments of the application are introduced above in detail, the principle and implementation modes of the disclosure are elaborated with specific examples in the disclosure, and the descriptions made to the embodiments are only adopted to help the method of the disclosure and the core concept thereof to be understood. In addition, those of ordinary skilled in the art may make variations to the specific implementation modes and the application scope according to the concept of the disclosure. From the above, the contents of the specification should not be understood as limits to the disclosure.

The invention claimed is:

1. A method for adjusting a parameter of sound effect, comprising:
   acquiring a first parameter of sound effect of a mobile terminal;
   determining the first parameter of sound effect to be a second parameter of sound effect, wherein the second parameter of sound effect is an initial parameter of sound effect of the mobile terminal;
   when an audio file is to be played, detecting whether a third parameter of sound effect for playing the audio file is consistent with the second parameter of sound effect;

in response to the third parameter of sound effect for playing the audio file being inconsistent with the second parameter of sound effect, detecting whether the third parameter of sound effect for playing the audio file falls within a preset range of the parameter of sound effect; and when the third parameter of sound effect is larger than a maximum value in the range of the parameter of sound effect or the third parameter of sound effect is smaller than a minimum value in the range of the parameter of sound effect, adjusting the third parameter of sound effect to be a fourth parameter of sound effect in the range of the parameter of sound effect, wherein the fourth parameter of sound effect is determined according to a sound effect mode matched with the audio file.

2. The method according to claim 1, wherein before detecting whether the third parameter of sound effect for playing the audio file is consistent with the second parameter of sound effect, the method further comprises:

determining a music type of the audio file; and setting the range of the parameter of sound effect according to the music type.

3. The method according to claim 1, wherein before detecting whether the third parameter of sound effect for playing the audio file is consistent with the second parameter of sound effect, the method further comprises:

determining a file type of the audio file; and setting the range of the parameter of sound effect according to the file type.

4. The method according to claim 1, wherein the range of the parameter of sound effect comprises more than one ranges, and each of the ranges is mapped to a point in time during playing of the audio file.

5. The method according to claim 1, wherein the sound effect mode is determined on the basis of at least one parameter comprising at least one of the following: time, ambient noise, or geographical position for playing of the audio file.

6. A method for adjusting a parameter of sound effect, comprising:

acquiring a first parameter of sound effect of a mobile terminal;

determining the first parameter of sound effect to be a second parameter of sound effect, wherein the second parameter of sound effect is an initial parameter of sound effect of the mobile terminal;

when an audio file is to be played, detecting whether a third parameter of sound effect for playing the audio file is consistent with the second parameter of sound effect;

in response to the third parameter of sound effect for playing the audio file being inconsistent with the second parameter of sound effect, detecting whether the third parameter of sound effect for playing the audio file falls within a preset range of the parameter of sound effect and when the third parameter of sound effect is larger than a maximum value in the range of the parameter of sound effect or the third parameter of sound effect is smaller than a minimum value in the range of the parameter of sound effect, adjusting the third parameter of sound effect to be a fifth parameter of sound effect in the range of the parameter of sound effect, wherein the method further comprises:

searching for one or more other audio files in the terminal having a same file type of music type with the audio file to be played and determining a sixth parameter of sound effect of the others audio files to be the fifth parameter of sound effect; or searching for a sound effect mode matched with the audio file in the terminal and determining a seventh parameter of sound effect corresponding to the sound effect mode to be the fifth parameter of sound effect.

7. The method according to claim 6, wherein before detecting whether the third parameter of sound effect for playing the audio file is consistent with the second parameter of sound effect, the method further comprises:

determining a music type of the audio file; and setting the range of the parameter of sound effect according to the music type.

8. The method according to claim 6, wherein before detecting whether the third parameter of sound effect for playing the audio file is consistent with the second parameter of sound effect, the method further comprises:

determining a file type of the audio file; and setting the range of the parameter of sound effect according to the file type.

9. The method according to claim 6, wherein the range of the parameter of sound effect comprises more than one ranges, and each of the ranges is mapped to a point in time during playing of the audio file.

10. A mobile terminal, comprising a processor and a memory, wherein the memory stores an executable program code; and the processor is configured to call the executable program code in the memory to execute a method comprising the following actions:

acquiring a first parameter of sound effect of a mobile terminal;

determining the first parameter of sound effect to be a second parameter of sound effect, wherein the second parameter of sound effect is an initial parameter of sound effect of the mobile terminal;

when an audio file is to be played, detecting whether a third parameter of sound effect for playing the audio file is consistent with the second parameter of sound effect;

in response to the third parameter of sound effect for playing the audio file being inconsistent with the second parameter of sound effect, detecting whether the third parameter of sound effect for playing the audio file falls within a preset range of the parameter of sound effect; and when the third parameter of sound effect is larger than a maximum value in the range of the parameter of sound effect or the third parameter of sound effect is smaller than a minimum value in the range of the parameter of sound effect, adjusting the third parameter of sound effect to be a fourth parameter of sound effect in the range of the parameter of sound effect, wherein the fourth parameter of sound effect is determined according to a sound effect mode matched with the audio file.

11. The mobile terminal according to claim 10, before detecting whether the third parameter of sound effect for playing the audio file is consistent with the second parameter of sound effect, the method further comprises:

determining a music type of the audio file; and setting the range of the parameter of sound effect according to the music type.

12. The mobile terminal according to claim 10, wherein before detecting whether the third parameter of sound effect for playing the audio file is consistent with the second parameter of sound effect, the method further comprises:
   determining a file type of the audio file; and
   setting the range of the parameter of sound effect according to the file type.

13. The mobile terminal according to claim 10, wherein the range of the parameter of sound effect comprises more than one ranges, and each of the ranges is mapped to a point in time during playing of the audio file.

14. The mobile terminal according to claim 10, the sound effect mode is determined on the basis of at least one parameter comprising at least one of the following: time, ambient noise, or geographical position for playing of the audio file.

15. A mobile terminal, comprising a processor and a memory, wherein
   the memory stores an executable program code; and
   the processor is configured to call the executable program code in the memory to execute a method comprising the following actions:
   acquiring a first parameter of sound effect of a mobile terminal;
   determining the first parameter of sound effect to be a second parameter of sound effect, wherein the second parameter of sound effect is an initial parameter of sound effect of the mobile terminal;
   when an audio file is to be played, detecting whether a third parameter of sound effect for playing the audio file is consistent with the second parameter of sound effect;
   in response to the third parameter of sound effect for playing the audio file being inconsistent with the second parameter of sound effect, detecting whether the third parameter of sound effect for playing the audio file falls within a preset range of the parameter of sound effect and
   when the third parameter of sound effect is larger than a maximum value in the range of the parameter of sound effect or the third parameter of sound effect is smaller than a minimum value in the range of the parameter of sound effect, adjusting the third parameter of sound effect to be a fifth parameter of sound effect in the range of the parameter of sound effect,
wherein the method further comprises:
   searching for one or more other audio files in the terminal having a same file type of music type with the audio file to be played and determining a sixth parameter of sound effect of the others audio files to be the fifth parameter of sound effect; or
   searching for a sound effect mode matched with the audio file in the terminal and determining a seventh parameter of sound effect corresponding to the sound effect mode to be the fifth parameter of sound effect.

16. The mobile terminal according to claim 15, before detecting whether the third parameter of sound effect for playing the audio file is consistent with the second parameter of sound effect, the method further comprises:
determining a music type of the audio file; and
setting the range of the parameter of sound effect according to the music type.

17. The mobile terminal according to claim 15, wherein before detecting whether the third parameter of sound effect for playing the audio file is consistent with the second parameter of sound effect, the method further comprises:
   determining a file type of the audio file; and
   setting the range of the parameter of sound effect according to the file type.

18. The mobile terminal according to claim 15, wherein the range of the parameter of sound effect comprises more than one ranges, and each of the ranges is mapped to a point in time during playing of the audio file.

* * * * *